M. F. FOLEY & L. C. KONITZER.
CORN PLANTER.
APPLICATION FILED JUNE 10, 1916.
1,207,890.
Patented Dec. 12, 1916.
2 SHEETS—SHEET 1.
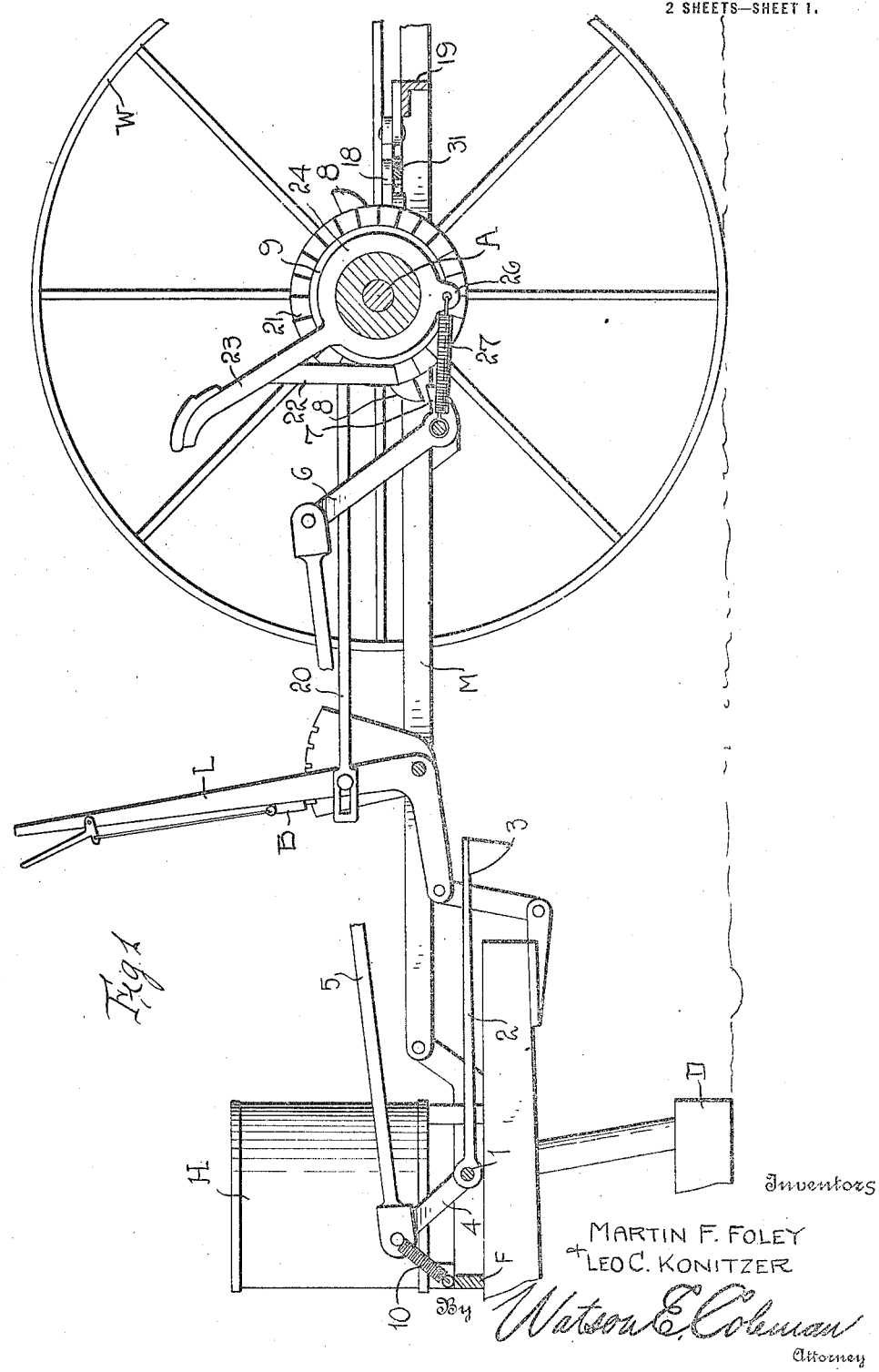
Inventors
MARTIN F. FOLEY
& LEO C. KONITZER
By Watson E. Coleman
Attorney

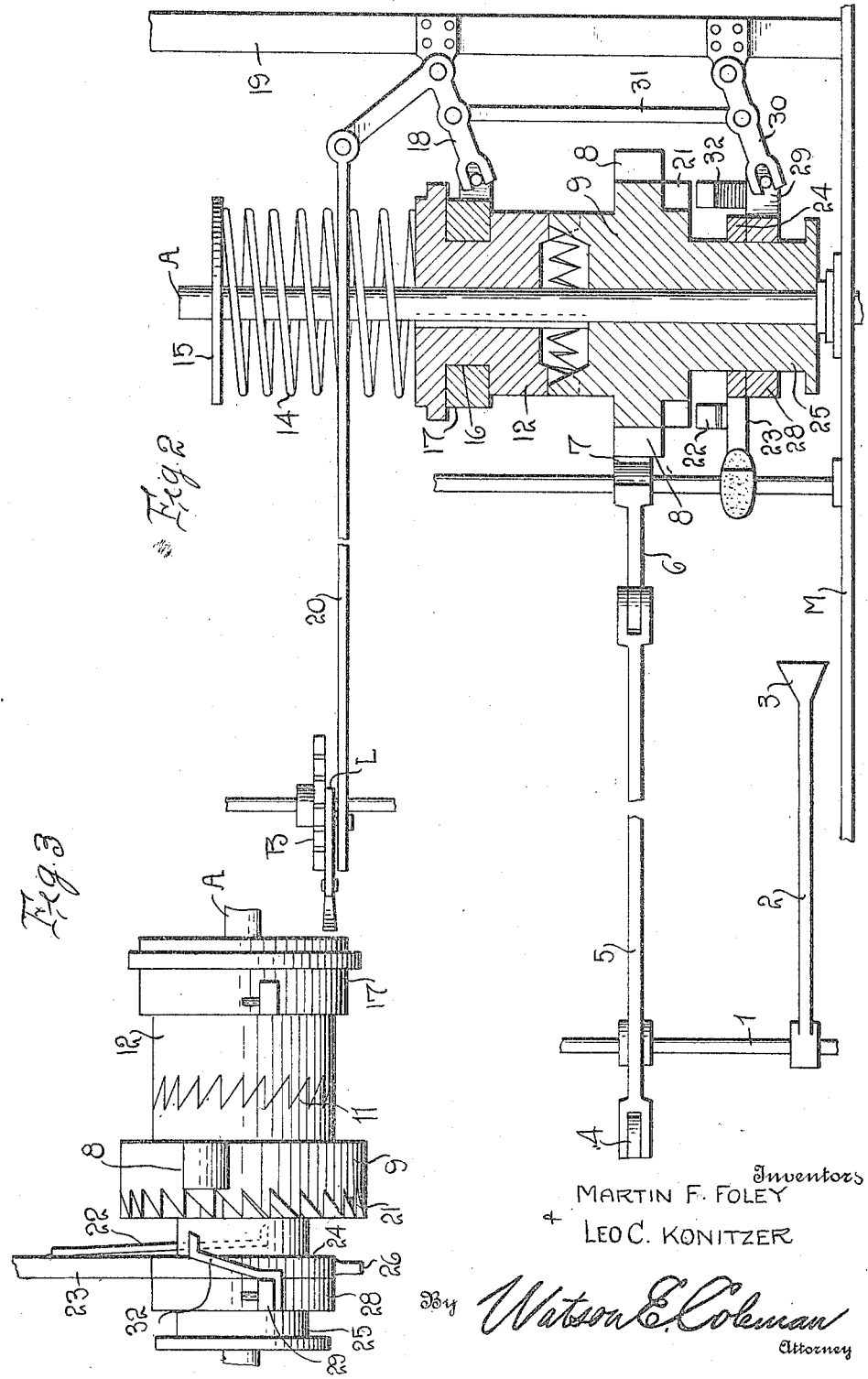

UNITED STATES PATENT OFFICE.

MARTIN F. FOLEY, OF GENESEO, AND LEO C. KONITZER, OF COLONA, ILLINOIS.

CORN-PLANTER.

1,207,890.   Specification of Letters Patent.   Patented Dec. 12, 1916.

Application filed June 10, 1916. Serial No. 103,011.

*To all whom it may concern:*

Be it known that we, MARTIN F. FOLEY and LEO C. KONITZER, citizens of the United States, residing at Geneseo and Colona, respectively, in the county of Henry and State of Illinois, have invented certain new and useful Improvements in Corn-Planters, of which the following is a specification, reference being had to the accompanying drawings.

This invention relates to certain improvements in corn planters and has relation more particularly to a device of this general character of a wireless type; and it is an object of the invention to provide novel and improved means whereby seed will automatically be caused to drop at fixed distances along the field rows.

It is also an object of the invention to provide a device of this general character with novel and improved means whereby the ground or "a hill" is marked in order to enable the operator to maintain his work in correct alinement.

Furthermore it is an object of the invention to provide a planter with novel and improved means whereby the dropping mechanism is automatically rendered inoperative when the runners or drills are raised and vice versa.

A still further object of the invention is to provide a device of this general character having novel and improved means under manual control for initially operating the dropping mechanism in order to assure the proper operation of the dropping mechanism especially when beginning a new row.

The invention consists in the details of construction and in the combination and arrangement of the several parts of our improved corn planter whereby certain important advantages are attained and the device is rendered simpler, less expensive and otherwise more convenient and advantageous for use, all as will be hereinafter more fully set forth.

The novel features of the invention will hereinafter be definitely claimed.

In order that our invention may be the better understood, we will now proceed to describe the same with reference to the accompanying drawings, wherein—

Figure 1 is a vertical sectional view taken through a corn planter illustrating an embodiment of our invention; Fig. 2 is a fragmentary view partly in top plan and partly in section illustrating certain features of our invention as herein included; and Fig. 3 is a fragmentary view in rear elevation of the means herein disclosed for controlling the rotation of the trip wheel.

As disclosed in the accompanying drawings, M denotes the main frame of a planter which coacts with the rotatable axle A provided with the drive wheels, as indicated at W.

F denotes a front frame of conventional construction and which supports the hoppers as indicated at H, and with which coact the conventional drills and runners as indicated at D. As the construction of the front frame F, the hoppers H and the concomitant parts thereof in their details form no particular feature of our invention, a detail description and illustration thereof is believed to be unnecessary other than to state that 1 denotes the shaft for operating the valves of the hoppers H and that the front frame F is adapted to be raised or lowered through the medium of the controlling lever L pivotally mounted upon the shaft S supported by the main frame M. The lever L is under control of the conventional locking mechanism as indicated at B. It is to be further observed that fixed to the shaft 1 adjacent each hopper H is a spring rock arm 2 having its free extremity provided with the ground engaging implement 3 which serves to mark the ground at the time the seeds are dropped for a purpose which is believed to be clearly apparent to those skilled in the art to which our invention appertains.

The shaft 1 is adapted to be intermittently rocked for the requisite dropping of the seeds and for this purpose the shaft 1 is provided with the rock arm 4 which has pivotally engaged with its free extremity the link 5 which extends over the main frame M and is pivotally engaged with the upper extremity of the trip lever 6 pivotally supported by the main frame M. The pivoted extremity of the lever 6 is provided with the angularly disposed tail or lug 7 adapted to be engaged by the cams or lugs 8 carried by the wheel 9 loosely mounted upon the axle A. The lugs or cams 8 are preferably diametrically opposed so that the trip lever 6 will be operated twice upon a single rotation of the wheel 9 in order to impart the requisite movement to the shaft 1 to permit the seed to drop. However, we do not wish to be limited to any particular number of lugs or cams as such number will be controlled by the dictates of practice.

Interposed between and operatively engaged with the rock arm 4 and the front frame F is the retractile member 10, herein disclosed as a conventional coil spring which serves to normally hold the rock arm 4 in its lowered position or in a position to maintain the discharge of the hoppers H closed.

The wheel 9 has one end provided with the clutch face 11 with which is adapted to coact the clutch member 12 adapted to rotate with the axle A but capable of movement longitudinally thereof, and said clutch member 12 is constantly urged toward the clutch face 11 through the medium of the expansible member 14 herein disclosed as a conventional coil spring encircled around the axle A and interposed between the clutch member 12 and a stop or abutment 15 suitably positioned upon the axle A.

The clutch member 12 is provided with an annular groove 16 in which is loosely seated a collar 17 having operatively engaged therewith an extremity of the bell crank lever 18, the heel portion of which being pivotally engaged with a cross member 19 of the main frame M. The opposite extremity of the bell lever 18 has operatively engaged therewith the link bar 20 which is also operatively engaged with the controlling lever L, whereby it will be perceived that when the lever L is thrown backward to elevate the runners, the clutch member 12 will be disengaged from the clutch face 11 and thus render the dropping mechanism inoperative and when the controlling lever L is moved forwardly to lower the runners, the clutch member 12 is caused to operatively engage the clutch face 11 in order to cause the dropping mechanism to operate upon the travel of the planter. This arrangement is of particular advantage in making a turn at the ends of a road or during the transportation of the planter from one locality to another.

The periphery of the wheel 9 at the side thereof remote from the clutch face 11 is provided with an annular series of ratchet teeth 21 adapted to be engaged by the pawl 22 carried by the foot lever or pedal 23 extending upwardly from the annular member 24 loosely mounted upon the extended hub portion 25 of the wheel 9. The annular member 24 is provided with an extension 26 with which is connected a retractile member 27 disclosed as a conventional coil spring which is also suitably secured to the main frame M and which serves to normally maintain the foot lever or pedal 23 elevated.

The lever or pedal 23 or more particularly the pawl 22 carried thereby is adapted to coact with the ratchet teeth 21 when the clutch member 12 is disengaged from the clutch face 11 so that the operator may manually obtain an initial operation of the dropping mechanism to assure the proper dropping of the seeds under the influence of the wheel 9, as in the beginning of a new row or from any other cause. Also loosely mounted upon the extension 25 of the wheel 9 is an annular member 28 provided with an outwardly directed extension 29 with which is operatively engaged a link 30 also pivotally engaged with the main frame M or the cross member 19, and said link 30 is preferably arranged in parallelism with the adjacent arm of the bell lever 18.

31 denotes a bar interposed between the link 30 and the adjacent arm of the bell lever 18 intermediate the length thereof whereby the link 30 will be caused to move in unison with the bell lever 18 so that when the bell lever 18 is adjusted in order to disengage the clutch member 12 from the clutch face 11, the annular member 24 will be moved toward the wheel 9 in order to permit the proper coaction between the pawl 22 and the ratchet teeth 21.

The annular member 28 is also provided with a spring dog or pawl 32 which coacts with the ratchet teeth 21 to prevent retrograde movement of the wheel 9, particularly during the operation of the foot lever or pedal 23.

From the foregoing description, it is thought to be obvious that a corn planter constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice, except as hereinafter claimed.

We claim:

1. In a corn planter, the combination of a main frame, a dropping mechanism operatively engaged with the main frame and including a movable frame, a driven axle carried by the main frame, a controlling lever carried by the main frame for raising and lowering the front frame, a trip wheel loosely mounted on the axle, a trip lever pivotally supported by the main frame and operatively engaged with the dropping mechanism, said trip lever being in the path of the trip wheel whereby the dropping mechanism may be intermittently operated upon rotation of the trip wheel, a clutch member slidably engaged with the axle, means operatively engaged with the controlling lever for forcing the clutch member into operative engagement with the trip wheel when the controlling lever is moved to lower the front frame and to disengage the clutch member from the trip wheel when the controlling lever is moved to raise the front frame, a lever loosely mounted on the axle and provided with a pawl, said trip wheel being provided with teeth adapted to be engaged by the pawl, and means under control of the operating means for the clutch member for moving the lever in operative position relative to the trip wheel when the clutch member is moved away from the trip wheel, said last named means including an annular member loosely mounted on the axle and provided with a pawl coacting with the teeth of the trip wheel for holding said trip wheel against retrograde movement.

2. In a corn planter, the combination of a main frame, a dropping mechanism operatively engaged with the main frame and including a movable frame, a driven axle carried by the main frame, a controlling lever carried by the main frame for raising and lowering the front frame, a trip wheel loosely mounted on the axle, a trip lever pivotally supported by the main frame and operatively engaged with the dropping mechanism, said trip lever being in the path of the trip wheel whereby the dropping mechanism may be intermittently operated upon rotation of the trip wheel, a clutch member slidably engaged with the axle, a lever mounted on the axle and provided with a pawl, said trip wheel being provided with teeth adapted to be engaged by the pawl, an annular member rotatably supported by the clutch member and movable with said clutch member longitudinally of the axle, a sleeve loosely mounted upon the trip wheel at the side opposite to the clutch member, rock arms supported by the frame and operatively engaged with the annular member, said rock arms being connected to move in unison and in the same general direction, a connection between the controlling lever and one of said arms for imparting rocking movement thereto, a lever loosely mounted upon the trip wheel inwardly of the annular member coacting with said trip wheel, a pawl carried by the last named lever and engageable with the teeth of the trip wheel whereby said trip wheel is intermittently rotated upon movement of the lever in one direction, and a pawl carried by the annular member coacting with the trip wheel and engageable with the teeth of the trip wheel for holding said trip wheel against retrograde movement.

In testimony whereof we hereunto affix our signatures in the presence of two witnesses.

MARTIN F. FOLEY.
LEO C. KONITZER.

Witnesses:
JOHN F. DELANY,
MARY KONITZER.